Figure 1:
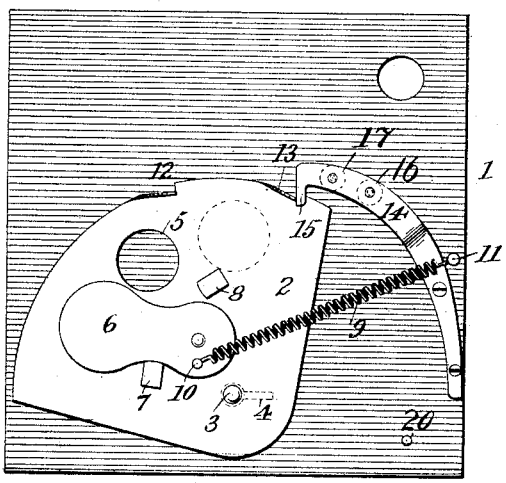

No. 621,332. Patented Mar. 21, 1899.
W. V. ESMOND.
PHOTOGRAPHIC SHUTTER.
(Application filed Mar. 30, 1898.)
(No Model.)

Witnesses:
Raphaïl Netter
Seabury C. Mastick

Inventor
William V. Esmond,
by Ernest Hopkinson his Atty.

UNITED STATES PATENT OFFICE.

WILLIAM V. ESMOND, OF NEW YORK, N. Y., ASSIGNOR TO MAXIMILIAN KAHN, OF SAME PLACE.

PHOTOGRAPHIC SHUTTER.

SPECIFICATION forming part of Letters Patent No. 621,332, dated March 21, 1899.

Application filed March 30, 1898. Serial No. 675,718. (No model.)

*To all whom it may concern:*

Be it known that I, WILLIAM V. ESMOND, a citizen of the United States, residing at the city of New York, borough of Manhattan, county of New York, and State of New York, have invented a new and useful Improvement in Photographic Shutters, of which the following is a specification.

The present invention relates to photographic shutters; and the object of the invention is to produce a simpler, cheaper, and at the same time better construction than those now in use.

The particular kind of shutter to which the present invention relates is that class of shutter which is set and held against spring-pressure and then is released and operated by a spring to effect the passage across the lens-opening of a wing provided with an exposure-opening. As is well known to those skilled in the art, shutters of this class must be provided with a supplemental or safety wing which covers the exposure-opening in the main wing while the shutter is being set, so as to prevent an accidental exposure of the sensitive plate or film in resetting.

In a shutter designed for general use it is essential that the same shall be capable of different operations. One mode of operation must effect an instantaneous exposure, while another mode of operation causes an exposure of more or less extended duration, which latter is called a "time" exposure. In constructions now in use this is generally accomplished by changing the setting of the shutter, and then the shutter is caused first to be released, so as to move into position to expose the sensitive film or plate, and then another releasing operation, subsequent thereto, closes the lens-opening to terminate the exposure. In my device no change is made in the setting of the shutter for either time or instantaneous exposure, but the desired effect is produced in the releasing mechanism.

In the drawings I have illustrated a construction embodying my invention, which construction, while it sets forth an embodiment of the invention in the form which I now consider to be the preferred form, may be subject to variations of mechanical details without departing from the spirit of the invention, and it will be understood that I do not limit myself to the specific construction illustrated and described in this application.

Figure 2:
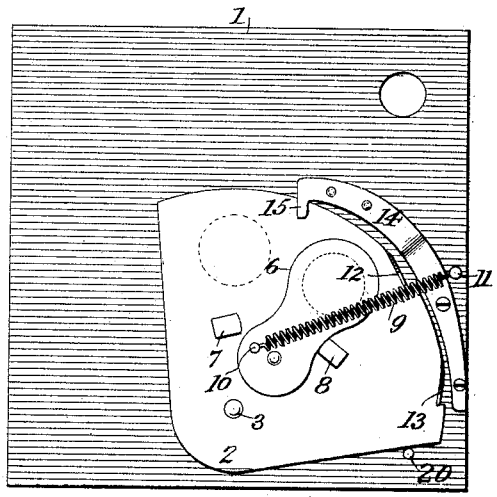
Figure 3:
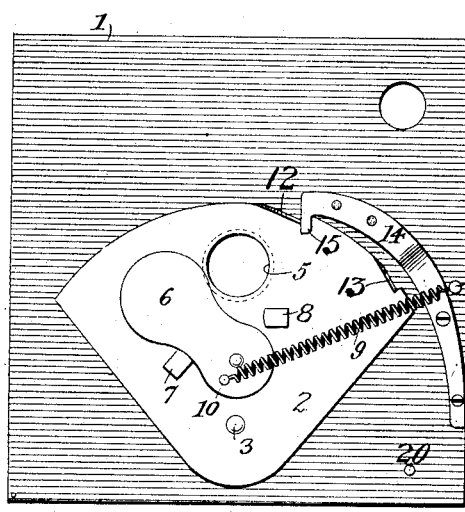
Figure 4:
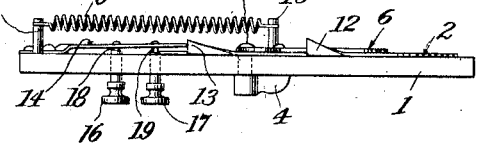

In the said drawings, Figure 1 shows a view in rear elevation of a front board of a camera with my shutter attached, the parts being shown as set ready to be released to make the exposure. Fig. 2 is a view similar to Fig. 1, but showing the shutter in the position it assumes after making the exposure. Fig. 3 is a view similar to Figs. 1 and 2, but showing the parts in the position assumed during the exposure when the shutter is set for timework. Fig. 4 is an edge view or top plan view of the parts as shown in Fig. 1.

Like symbols of reference refer to like parts throughout the several views of the drawings.

Referring to the drawings in detail, 1 designates the front board of a camera to which my shutter is attached. The shutter consists of the main wing 2, which is secured to the pivot 3, which is provided with a thumb-piece 4 on the opposite side of the front board, by means of which the shutter is returned to its first position. The wing 2 is provided with the usual exposure-opening 5 and is also provided with a supplemental or safety wing 6, which is pivoted thereon. Lugs 7 and 8 are borne on the main wing 2, said lugs limiting the movement of the safety-wing and also serving as points of application of the power by which the shutter is operated.

The single spring 9 is secured at one end to a pin 10 on the safety-wing 6 and at its other end to a pin 11 on the front board. The pin 10 on the safety-wing 6, to which one end of the spring is secured, is so placed on said wing as to be below the pivotal point of said wing when the shutter is in the set position. In this position (shown in Fig. 1) the supplemental wing rests against the lug or stop 7, thus leaving the exposure-opening 5 uncovered. In the movement of the main wing across the lens-opening the pin 10 is brought above or on the opposite side of the pivotal point of the safety-wing, as shown in Fig. 2, thus permitting the spring 9 to move the safety-wing to the position shown in Fig. 2, where it rests against the lug or stop 8, this movement of the supplemental wing taking place after the exposure-opening 5 has passed across the lens-opening.

I will now describe the retaining and releasing devices. Upon the outer edge of the main wing 2 are two catches 12 and 13, one of which, 12, projects somewhat beyond the other, 13. In the drawings these catches are shown as consisting of bent-up portions of the main wing 2; but it will be apparent that any other form of stop or catch may be availed of. Secured at one end to the front board of the camera is a spring-plate 14, which spring-plate is provided at its free end with a latch 15, projecting into the path of movement of the catches 12 and 13 on the main wing 2. Two pins 16 and 17 project through the front board, and shoulders 18 and 19 of different heights are formed on said pins and are adapted to impinge against the spring-plate 14 to move the latch 15 out of the path of movement of one or both of the catches 12 and 13 to effect a time or instantaneous exposure, as may be desired.

A stop 20 projects from the front board 1, against which stop the shutter comes to rest after making an exposure.

The operation of the device will now be apparent. Assuming the shutter to be set as shown in Fig. 1, if an instantaneous exposure is desired the operator presses the pin 16, thus causing the shoulder 18 to press against the plate 14. The length of the shoulder and the range of movement of the pin are so proportioned that the pressing of the same will lift the latch 15 out of the path of movement of both catches 12 and 13, thus permitting the spring 9 to cause the shutter to move entirely across the lens-opening. As has been heretofore explained, the tension of the spring 9 is first exerted (through the medium of the safety-wing) upon the main wing to move the same across the lens-opening to effect the exposure of the sensitive surface. Immediately the opening 5 has passed the lens-opening the spring-pressure is exerted upon the supplemental wing or safety-shutter by reason of the pin 10 rising above its pivotal point, and the safety-wing is thus caused to move independently of the main wing to close the exposure-opening 5, as shown in Fig. 2, in which figure the shutter is shown as having completed the exposure movement and resting against the stop 20. The shutter is then returned to first position by turning the thumb-piece 4, the safety-wing being held in position, closing the exposure-opening 5 during this movement until said opening has passed the lens-opening, when the spring 9 will cause the safety-wing 6 to uncover the exposure-opening 5.

If a time-exposure is desired, the pin 17 is pressed, this operation simply causing the latch 15 to be moved out of the path of movement of the catch 13. The spring then draws the shutter over to the position shown in Fig. 3, where the parts are arrested by the catch 12 engaging with the latch 15. To terminate the exposure, the pin 16 is pressed, which effects the disengagement of the latch 14 and catch 12, as has been heretofore explained.

What is claimed as new is—

1. In a photographic shutter, the combination of a main wing provided with an exposure-opening, a supplemental wing pivoted thereon, and a spring secured to the supplemental wing to one side of its pivotal point and exerting its tension upon one side of said pivotal point during a portion of the movement of the main wing and upon the opposite side of said pivotal point during the remainder of the movement of the main wing, substantially as specified.

2. In a photographic shutter, the combination of a main wing provided with an exposure-opening, a supplemental wing pivoted thereon, lugs on the main wing between which lugs the supplemental wing oscillates, and a spring secured to the supplemental wing to one side of its pivotal point and exerting its tension upon one side of said pivotal point during a portion of the movement of the main wing and upon the opposite side of said pivotal point during the remainder of the movement of the main wing, substantially as specified.

3. In a photographic shutter, the combination of a main wing provided with an exposure-opening, a supplemental wing pivoted thereon, a spring secured to the supplemental wing to one side of its pivotal point and exerting its tension upon one side of said pivotal point during a portion of the movement of the main wing and upon the opposite side of said pivotal point during the remainder of the movement of the main wing, catches on said wing, a latch engaging said catches and means for moving the latch out of the path of movement of one or both of said catches, substantially as specified.

4. In a photographic shutter the combination of a moving wing provided with an exposure-opening, catches on said wing, a latch engaging said catches, and two pins, one of which moves the latch out of the path of movement of one of said catches and the other moves said latch out of the path of movement of both catches, substantially as specified.

5. In a photographic shutter the combination of a moving wing provided with an exposure-opening, two catches of different heights on said wing, a latch engaging said catches and two pins provided with shoulders of different heights, one of which pins moves the latch out of the path of movement of one of the said catches and the other of said pins moves the latch out of the path of movement of both catches, substantially as specified.

In testimony whereof I have signed my name to this specification in the presence of two subscribing witnesses.

WILLIAM V. ESMOND.

Witnesses:
MAXIMILIAN KAHN,
SEABURY C. MASTICK.